US009063244B2

(12) United States Patent
Allen

(10) Patent No.: US 9,063,244 B2
(45) Date of Patent: *Jun. 23, 2015

(54) INDUCTION LOGGING SIGNALS USING COMPLEX WAVEFORMS AND DIRECTIONAL GUIDANCE ANTENNA SYSTEMS

(75) Inventor: Robbie L. Allen, The Woodlands, TX (US)

(73) Assignee: Baker Hughes Incorporated, Houston, TX (US)

( * ) Notice: Subject to any disclaimer, the term of this patent is extended or adjusted under 35 U.S.C. 154(b) by 492 days.

This patent is subject to a terminal disclaimer.

(21) Appl. No.: 13/423,612

(22) Filed: Mar. 19, 2012

(65) Prior Publication Data

US 2013/0241560 A1  Sep. 19, 2013

(51) Int. Cl.
| G01V 3/00 | (2006.01) |
| G01V 3/28 | (2006.01) |
| G01V 3/30 | (2006.01) |
| G01V 3/26 | (2006.01) |

(52) U.S. Cl.
CPC ... *G01V 3/28* (2013.01); *G01V 3/30* (2013.01); *G01V 3/26* (2013.01)

(58) Field of Classification Search
CPC ............ G01V 1/44; G01V 1/52; G01V 1/42; G01V 1/40; G01V 1/50; G01V 3/12; G01V 1/145; G01V 3/30; G01V 3/08; G01V 3/28; G01V 3/20; G01V 3/26; G01V 11/002; G01V 1/48; G01V 3/00; G01V 3/083; G01V 3/34; G01V 3/38; G01V 11/00; G01V 5/045; E21B 47/01; E21B 47/026; E21B 47/122; E21B 47/00; E21B 49/003; E21B 49/005; G01H 15/00
See application file for complete search history.

(56) References Cited

U.S. PATENT DOCUMENTS

| 5,066,916 | A | * | 11/1991 | Rau ............................. 324/338 |
| 5,233,522 | A | | 8/1993 | Sinclair |
| 5,260,660 | A | | 11/1993 | Stolarczyk |
| 5,345,179 | A | | 9/1994 | Habashy et al. |
| 5,434,507 | A | * | 7/1995 | Beren et al. .................. 324/338 |
| 5,814,988 | A | | 9/1998 | Itskovich et al. |
| 6,100,696 | A | | 8/2000 | Sinclair |
| 6,194,902 | B1 | | 2/2001 | Kuo et al. |
| 6,691,779 | B1 | | 2/2004 | Sezginer et al. |

(Continued)

OTHER PUBLICATIONS

S.D. Bonner, New 2-MHz Multiarray Borehole-Compensated Resistivity Tool Developed for MWD in Slim Holes, SPE 30547, SPE Internation, Oct. 22-25, 1995, pp. 147-162, Dallas Texas.

(Continued)

*Primary Examiner* — Vinh Nguyen
(74) *Attorney, Agent, or Firm* — Cantor Colburn LLP

(57) ABSTRACT

An apparatus for estimating a property of an earth formation penetrated by a borehole includes: a carrier configured to be conveyed through the borehole; a transmitter antenna disposed at the carrier and configured to emit electromagnetic energy into the earth formation; a controller configured to control electrical current of frequency f transmitted to the transmitter antenna, wherein the transmitted electrical current is non-sinusoidal having a first section with a uniform positive slope and a second section with a uniform negative slope; a receiver antenna configured to receive a signal from the formation indicative of the property; and a processor configured to receive the signal from the receiver antenna and to estimate the property using the received signal.

23 Claims, 10 Drawing Sheets

(56) References Cited

U.S. PATENT DOCUMENTS

| | | |
|---|---|---|
| 6,765,385 B2 | 7/2004 | Sinclair et al. |
| 6,766,854 B2 | 7/2004 | Ciglenec et al. |
| 6,777,940 B2 | 8/2004 | Macune |
| 6,864,801 B2 | 3/2005 | Tabanou et al. |
| 6,961,663 B2 | 11/2005 | Sinclair et al. |
| 7,154,411 B2 | 12/2006 | Ciglenec et al. |
| 7,777,490 B2 | 8/2010 | Haans et al. |
| 7,948,238 B2 | 5/2011 | Bittar |
| 8,050,865 B2 | 11/2011 | Zhao et al. |
| 8,072,347 B2 | 12/2011 | Santoso et al. |
| 8,085,049 B2 | 12/2011 | Bittar |
| 2006/0055411 A1* | 3/2006 | Banning et al. ............... 324/338 |
| 2006/0233047 A1* | 10/2006 | Zeroug et al. ................... 367/25 |
| 2008/0068211 A1 | 3/2008 | Aiello |
| 2010/0126717 A1 | 5/2010 | Kuchuk et al. |
| 2011/0084698 A1 | 4/2011 | Wisler |
| 2012/0074946 A1 | 3/2012 | Forgang et al. |
| 2012/0274329 A1 | 11/2012 | Tabarovsky et al. |

OTHER PUBLICATIONS

Hagiwara, T. Extra Long Spaced Induction Log, SEG Int'l Exposition, Oct. 10-15, 2004, pp. 1-4, Denver, Colorado.

* cited by examiner

INDUCTION LOGGING SIGNALS USING COMPLEX WAVEFORMS AND DIRECTIONAL GUIDANCE ANTENNA SYSTEMS

BACKGROUND

Geologic formations may be used for various purposes such as hydrocarbon production, geothermal production, and carbon dioxide sequestration. So that resources devoted to these purposes may be efficiently used, it is important to characterize the formations. Typically, many different types of tools and instruments may be disposed in boreholes penetrating the formations in order to characterize or determine properties of the formations.

One type of tool used to characterize formations is an induction logging tool. The induction logging tool induces electrical currents in a formation of interest and receives signals in response to the induced current. The signals include information related to an electrical characteristic of the formation of interest such as the formation's resistivity or its inverse conductivity. Because electrical characteristics can vary throughout the formation, improvements to induction logging tools that increase or improve their sensitivity would be appreciated by the drilling industry.

BRIEF SUMMARY

Disclosed is an apparatus for estimating a property of an earth formation penetrated by a borehole. The apparatus includes: a carrier configured to be conveyed through the borehole; a transmitter antenna disposed at the carrier and configured to emit electromagnetic energy into the earth formation; a controller configured to control electrical current of frequency f transmitted to the transmitter antenna, wherein the transmitted electrical current is non-sinusoidal having a first section with a uniform positive slope and a second section with a uniform negative slope; a receiver antenna configured to receive a signal from the formation indicative of the property; and a processor configured to receive the signal from the receiver antenna and to estimate the property using the received signal.

Also disclosed is a method for estimating a property of a formation penetrated by a borehole. The method includes: conveying a carrier through the borehole; transmitting electrical current at frequency f to a transmitter antenna disposed at the carrier in order to emit electromagnetic energy into the earth formation, wherein a controller controls the electrical current such that the electrical current is non-sinusoidal having a first section with a uniform positive slope and a second section with a uniform negative slope; receiving a signal from the formation indicative of the property using a receiver antenna; and estimating the property using the received signal.

Further disclosed is a non-transitory computer readable medium having computer executable instructions for estimating a property of a formation penetrated by a borehole by implementing a method that includes: transmitting electrical current to a transmitter antenna disposed at the carrier in order to emit electromagnetic energy of frequency f into the earth formation, wherein a controller controls the electrical current such that the electrical current is non-sinusoidal having a first section with a uniform positive slope and a second section with a uniform negative slope; receiving a signal from the formation indicative of the property using a receiver antenna; and estimating the property using the received signal.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method presented herein by way of exemplification and not limitation with reference to the Figures.

Figure 1:
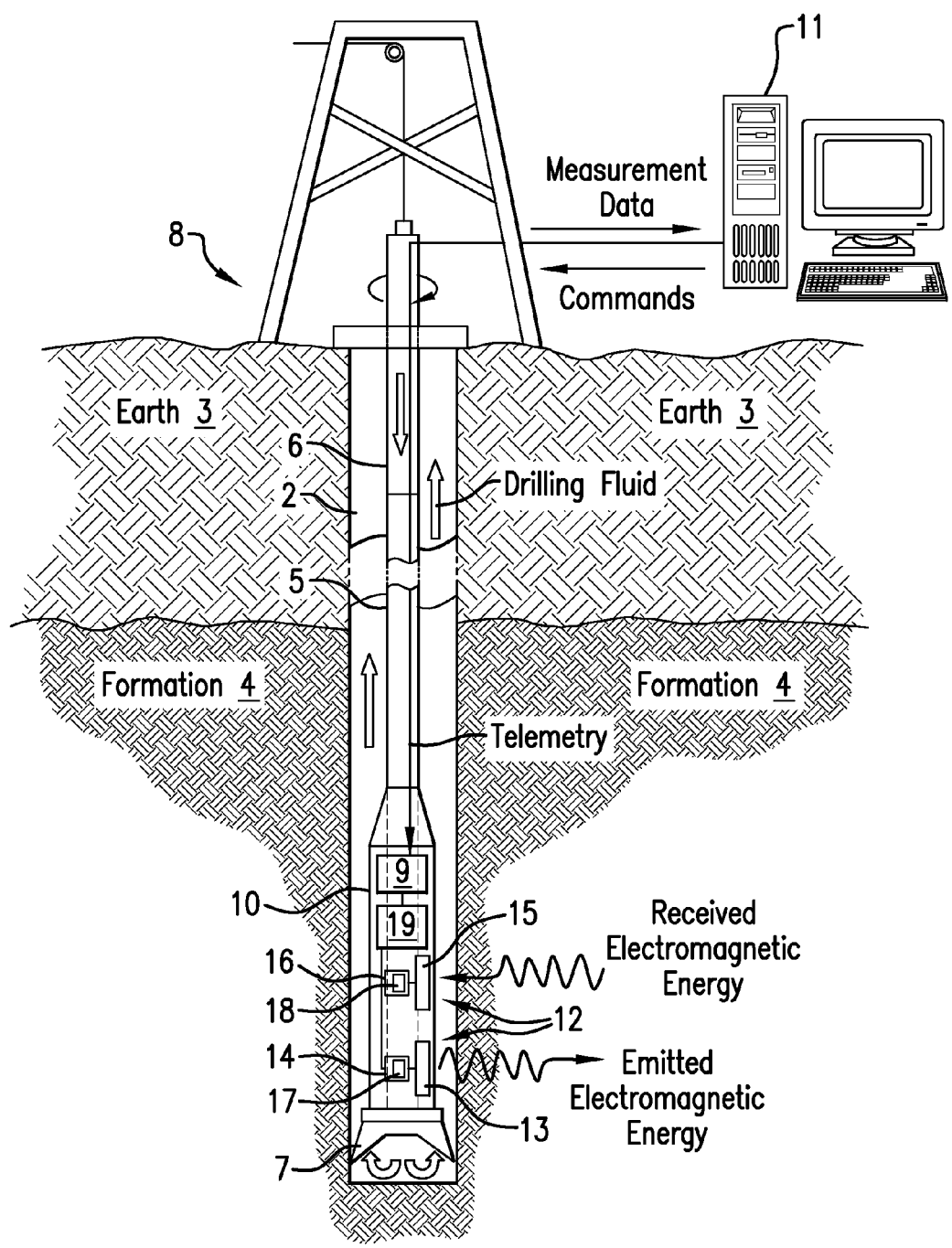
FIG. 1 illustrates an exemplary embodiment of a downhole tool disposed in a borehole penetrating the earth.

FIG. 1 illustrates a cross-sectional view of an exemplary embodiment of an induction logging tool 10 disposed in a borehole 2 penetrating the earth 3, which includes an earth formation 4. The formation 4 represents any subsurface material of interest (including borehole material and invasion zone). The induction logging tool 10 is conveyed through the borehole 2 by a carrier 5. In the embodiment of FIG. 1, the carrier 5 is a drill string 6 in an embodiment known as logging-while-drilling (LWD). Disposed at a distal end of the drill string 6 is a drill bit 7. A drilling rig 8 is configured to conduct drilling operations such as rotating the drill string 6 and thus the drill bit 7 in order to drill the borehole 2. In addition, the drilling rig 8 is configured to pump drilling fluid through the drill string 6 in order to lubricate the drill bit 7 and flush cuttings from the borehole 2. Downhole electronics 9 are configured to operate the induction logging tool 10, process measurements or data received from the tool 10, record the data for later retrieval, and/or provide a telemetry interface. Telemetry is used to provide communications between the induction logging tool 10 and a computer processing system 11 disposed at the surface of the earth 3. Data processing or tool operations can also be performed by the computer processing system 11 in addition to or in lieu of the downhole electronics 9. The induction logging tool 10 may operate intermittently, at particular intervals, or continuously during the drilling process. In an alternative embodiment, the carrier 5 can be an armored wireline in an embodiment known as wireline logging. Other conveyances can be pumping down an induction tool through drill pipe or attaching an induction tool to coiled tubing lowered into the earth.

The induction logging tool (ILT) 10 is configured to perform measurements of properties of the formation 4. Non-limiting examples of the properties include resistivity, conductivity, fracture pattern detection and location, or fault pattern detection and location. The ILT 10 includes a transmitter 14 coupled to a transmitter antenna 13. The transmitter 14 is configured to apply voltage or current at amplitude A and frequency f to the transmitter antenna 13, which is configured to emit electromagnetic energy having the frequency f. The emitted electromagnetic energy induces electrical currents, which may be referred to as induced currents, eddy currents or Foucault currents, in the formation 4. The induced currents in turn emit electromagnetic energy also referred to as signals having a characteristic related to an electrical property of interest of the formation 4. Hence, by measuring the signals to determine the characteristic, the electrical property of interest can be determined.

In order to receive the return signals, the ILT 10 includes a receiver antenna 15 coupled to a receiver 16. The receiver antenna 15 is configured to receive the signals and to convert them to electrical signals that are amplified by the receiver 15. The electrical signals are characterized by the downhole electronics 9 or the computer processing system 11 in order to determine or estimate the property of interest. Received electrical signals for specific probed formation regions may be derived from complex current related patterns and may be referred to as signatures because of their unique identity.

It can be appreciated that the transmitter antenna 13 and the receiver antenna 15 can have various embodiments. In one or more embodiments, one or more of the antennas 13 and 15 can be coils. It can also be appreciated that transmitting and receiving function of the antennas 13 and 15 can be incorporated into a single antenna or group of antennas where each antenna can be configured to both transmit and receive electromagnetic energy. Hence, discussions related to transmitting or receiving electromagnetic energy may inherently include antennas that both transmit and receive electromagnetic energy and functions of the transmitter 14 and the receiver 16 can be included in a transceiver. Similarly, discussions related to a transceiver and transmitting and receiving (i.e., transceiver) antennas may inherently include using separate transmitters and receivers and separate transmitting and receiving antennas.

A controller 19 is coupled to the transmitter 14 and the receiver 16 and is configured to control the output of the transmitter 14 based on input received from the receiver 16. Non-limiting embodiments of aspects of the electromagnetic energy emitted by the transmitter antenna 13 include amplitude, frequency, slope of a wave form, and duration of the slope. In one or more embodiments, the transmitter 13 includes a digital-to-analog converter (DAC) 17 configured to convert a digital signal received from the controller 14 into an analog signal or wave form having a desired characteristic for transmission into the formation 4. Similarly, in one or more embodiments, the receiver 16 includes an analog-to-digital converter (ADC) 18 configured to convert an analog signal received from the formation 4 into a digital signal for processing. It can be appreciated that various functions of the downhole electronics 9, the computer processing system 11, the transmitter 14, the receiver 16, and the controller 19 may be performed by any one of these devices or distributed among two or more of these devices.

Figure 2:
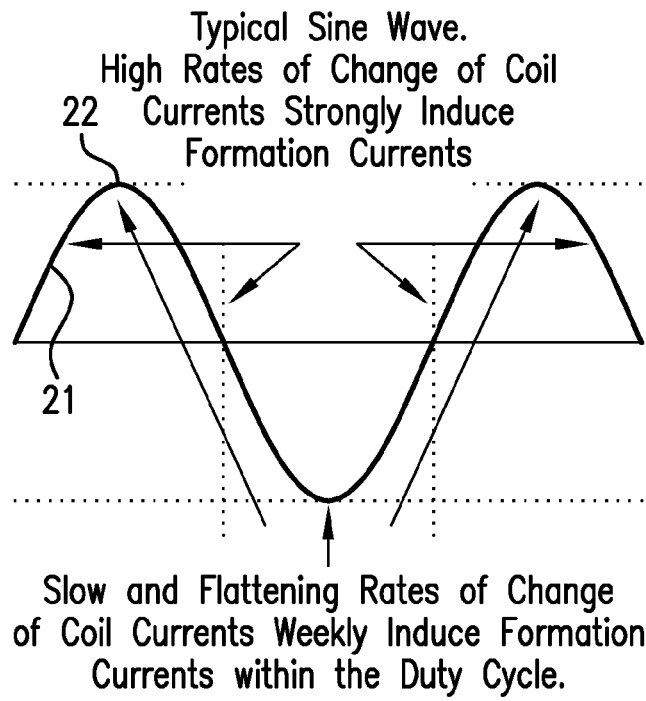
FIG. 2 depicts aspects of one embodiment of electromagnetic energy emitted by the downhole tool into the earth.

FIG. 2 depicts aspects of sinusoidal current in a transmitter coil. At 21, high rates of change of coil current strongly induce formation currents, while lower and flattening rates of change of coil current at 22 weakly induce formation currents within the duty cycle shown. Portions of sine wave signals have rapidly varying currents and other portions of the sine wave signals have very slowly changing currents. As a consequence, currents induced in formations by sine waves can vary greatly or attenuate over significant portions of wave time periods. Also, the high rates of change in sine wave currents frequently overly influence shallower parts of formations near well bores invaded by drilling fluids. In contrast, the lower rates of current changes near wave peaks and troughs may have some abilities to penetrate to greater radial depths or distances from the borehole. Unfortunately, weaker induction strength capabilities may often limit penetration depths due to smaller amplitudes of induced signals at greater depths. Weaker deep signals are more difficult to detect and frequently have lower signal to noise ratios.

Figure 3:
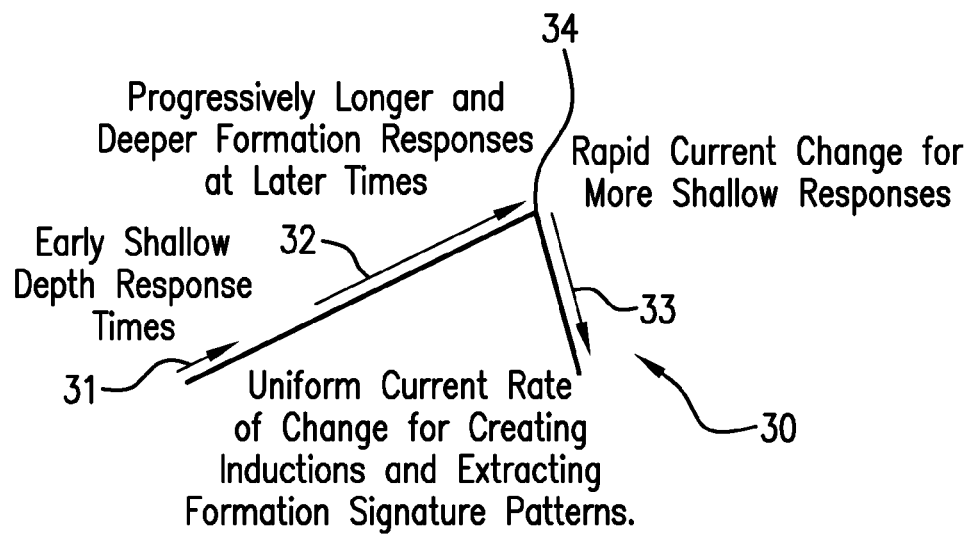
FIG. 3 depicts aspects of another embodiment of electromagnetic energy emitted by the downhole tool into the earth.

In order to provide stronger deep signals, the transmitter 14 and the transmitter antenna 13 in one or more embodiments are configured to emit electromagnetic energy in a waveform having a "saw-tooth" pattern 30 as illustrated in FIG. 3. Longer ramped current pulses can at first induce shallow eddy currents and a progression of currents more deeply within formations. At 31, the coil current induces an early shallow depth response from the formation 4. At 32, progressively longer and deeper formation responses are induced at later times. At 33, a rapid coil current change may induce more shallow responses (as opposed to deeper responses if coil current change occurs over a longer duration) from the formation 4. At 34, a region of sign-change from positive slope to negative slope occurs more rapidly than in a sine wave. One characteristic of the saw-tooth pattern 30 is that the time duration for the current change (i.e., at the corners) from maximum magnitude positive slope (or maximum magnitude negative slope) to maximum magnitude negative slope (or maximum magnitude positive slope) illustrated at 34 is less than those current changes in a sine wave. To be clear, the time duration for those current changes in a sine wave is one-half the time period of that sine wave (i.e., time duration=1/(2·frequency). Magnitude of a slope refers to the absolute value of the slope. The saw-tooth pattern may also be described as having a first section 35 with a uniform positive slope and a second section 36 with a uniform negative slope. In one or more embodiments, the controller 19 may be configured to generate pulses of the emitted electromagnetic energy with curving or increasing or decreasing rates of change of currents to cancel systematic inductance or capacitance characteristics of the circuitry, the borehole 2, or various portions of the formation 4. Received signals can be processed to dynamically alter controller outputs to generate variations in more emitted electromagnetic energy capable of inducing currents with characteristics that will compensate for and better measure localized borehole and formation characteristics.

Figure 4A:
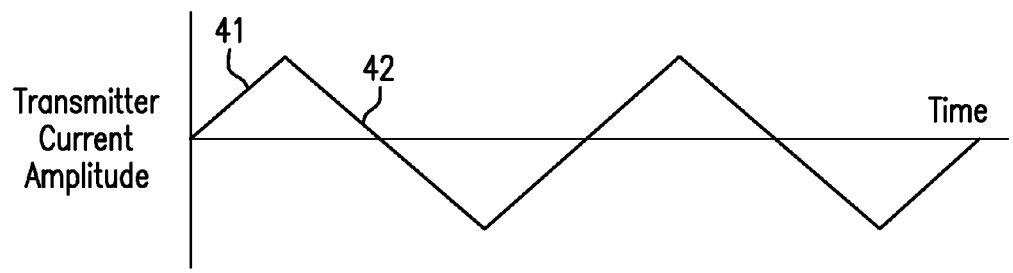
FIGS. 4A, 4B, and 4C, collectively referred to as FIG. 4, depict aspects of various embodiments of electromagnetic energy emitted by the downhole tool into the earth.
Figure 4B:
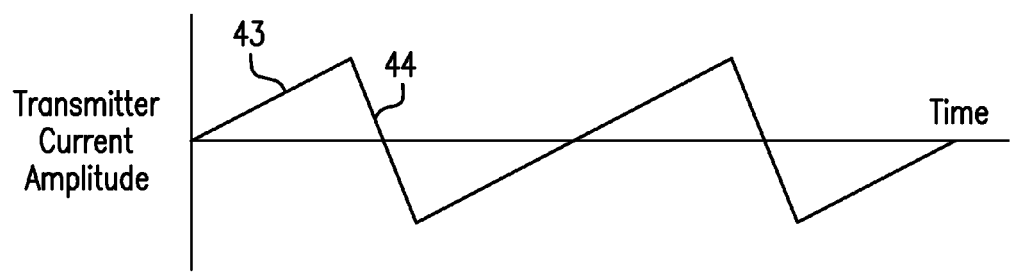
Figure 4C:
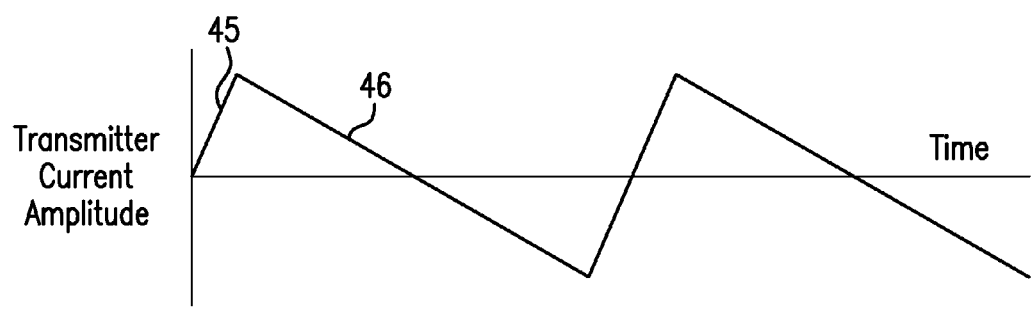

FIG. 4 depicts aspects of various saw-tooth patterns of coil currents for transmitting electromagnetic energy in to the formation 4. In FIG. 4A, the saw-tooth pattern is symmetrical with the absolute value of the positive slope at 41 equal to the absolute value of the negative slope at 42. In FIG. 4B, the saw-tooth pattern is asymmetrical with the absolute value of the positive slope at 43 being less than the absolute value of the negative slope at 44. In FIG. 4C, the saw-tooth pattern is symmetrical with the absolute value of the positive slope at 45 being greater than the absolute value of the negative slope at 46. Generally, the saw-tooth pattern excludes square wave type pulses having vertical slopes that are undefined as division by zero.

As noted above, the controller 19 may be configured to control the output of the transmitter 14 based on input received from the receiver 16 due to receiving a return signal from the formation 4. For example, the induction logging tool 10 may emit first electromagnetic energy having a first characteristic that results in the receiver antenna 15 receiving a return signal from the formation 4. The return signal includes information that the controller 19 may use to emit second electromagnetic energy into the formation 4. The second electromagnetic energy has a second characteristic, which is determined by the controller 19 using a characteristic of the return signal. The controller 19 may determine the second characteristic using a look-up table or by implementing an algorithm that acts upon the characteristic of the return signal. It can be appreciated that by changing the second characteristic, the ILT 10 may probe deeper into the formation or receive a return signal having a higher signal to noise ratio. For example, if the return signal indicates a deeper invasion zone (i.e., zone near borehole infiltrated by drilling fluid) than expected, then the controller 19 can signal the transmitter 14 to decrease the frequency f of the transmitter current such that the transmitter current (and thus the emitted electromagnetic energy) has an increased ramp-up time to probe deeper into the formation. For another example, if thin beds are initially detected, then the controller 19 can signal the transmitter 14 to increase the frequency f to have a greater rate of change of uniform slope (positive slope and/or negative slope) of the transmitter current to better measure the thin beds. In a further example, in very resistive beds, the controller 19 can signal the transmitter 14 to transmit lower amplitude current in order to prevent higher amplitude induced currents from reaching more conductive upper or lower beds. It can be appreciated that combinations of stronger and/or weaker induced currents may be induced by using different antenna systems in the ILT 10 to produce combinations of currents (and related signals) that can accommodate complex variations in clusters of different beds with wide ranges of conductivities. It can also be appreciated that the controller 19, using reactive controller software, can respond to rapidly changing characteristics of various formation segments or regions to more accurately characterize variations within the earth with higher resolution than prior art logging systems.

Using digital to analog drivers to produce many variations in transmitter currents within coils in groups can result in many useful combinations of induced formation currents having complex flow path shapes. Abundant measurements expedite mathematical sorting and analysis for deriving more localized formation characteristics.

Figure 5:
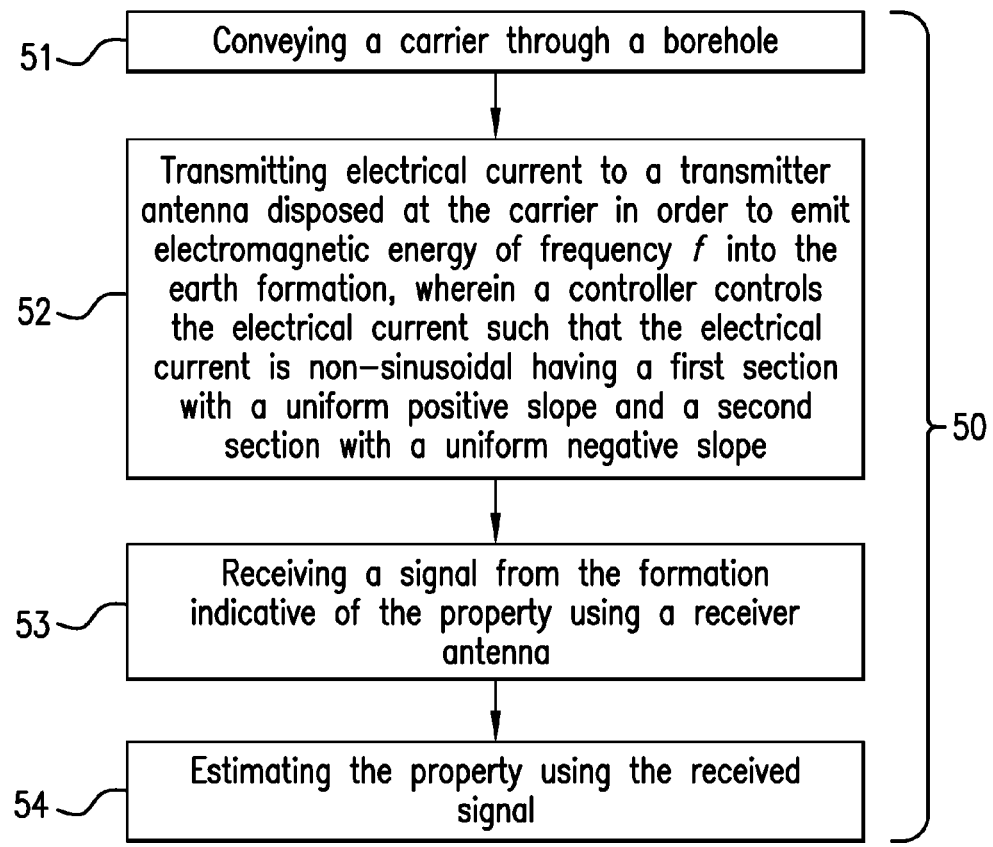
FIG. 5 illustrates a flow chart for a method for estimating a property of an earth formation penetrated by a borehole.

FIG. 5 illustrates a flow chart for a method 50 for estimating a property of an earth formation penetrated by a borehole. Block 51 calls for conveying a carrier through the borehole. Block 52 calls for transmitting electrical current at frequency f to a transmitter antenna disposed at the carrier in order to emit electromagnetic energy into the earth formation, wherein a controller controls the electrical current such that the electrical current is non-sinusoidal having a first section with a uniform positive slope and a second section with a uniform negative slope. Block 53 calls for receiving a signal from the formation indicative of the property using a receiver antenna. Block 54 calls for estimating the property with a processor that receives the signal from the receiver antenna. The method 50 may also include emitting other electromagnetic energy having a characteristic determined by the controller based on the received signal, receiving another signal due to the emitting of the other electromagnetic energy, and estimating the property using the another signal. The method 50 may also include transmitting the electrical current to the transmitter antenna as pulses of electrical current having the frequency f where a pulse repetition rate may be varied and/or the frequency f of electrical current in each pulse may be varied for different pulses. The method 50 may also include, in addition to the transmitting of non-sinusoidal electrical current, transmitting sinusoidal electrical current to the transmitter antenna to provide measurements similar to conventional logging tools for classical reference data to compare with past measurements in previously logged formations.

Figure 6:
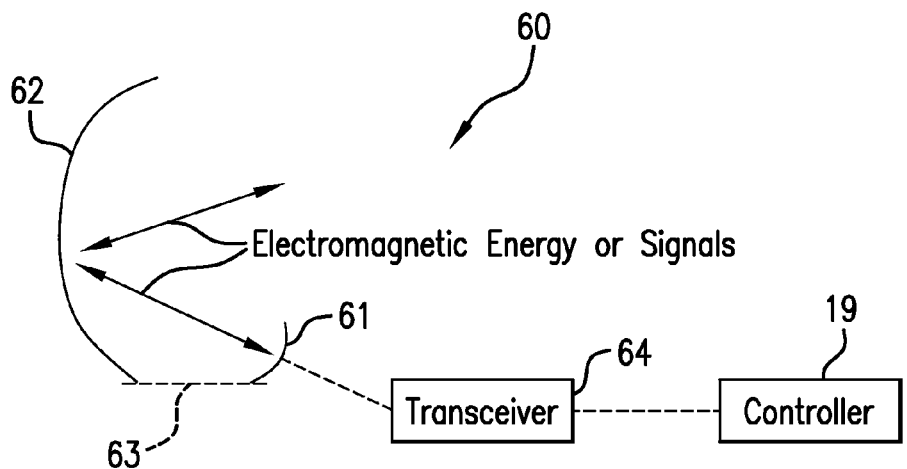
FIG. 6 depicts aspects of an antenna assembly and a transceiver used in presenting various antenna configuration embodiments.

Next, various embodiments of antenna systems are introduced. These antenna systems provide focusing surfaces such as antenna groups and waveguides that may emit, induce, receive, select, and concentrate electromagnetic energy or signals. For convenience and clarity, FIG. 6 illustrates one example of an antenna system 60 that is referred to in some of the following antenna system embodiments. While not shown for clarity purposes, the antenna system may be disposed at the ILT 10 or carrier 5. The term "disposed at" relates to the antenna system 60 being disposed on, in, within or coupled to ILT 10 or carrier 5. The antenna system 60 includes a transceiver antenna 61 configured to transmit and/or receive electromagnetic energy or signals. A transceiver 64 is coupled to the transceiver antenna 61 and is configured to transmit or receive electrical current to or from the transceiver antenna 61. The antenna system 60 also includes a reflector antenna 62 configured to reflect electromagnetic energy transmitted by the transceiver antenna 61 or to reflect signals received from the formation 4 to the transceiver antenna 61. A structure 63 such as a bracket may be used to support and maintain alignment of the antennas 61 and 62. Articulating supports driven by electrical motors may also move or reorient the antennas. It can be appreciated that functions of the transceiver 64 may be performed by separate devices such as the transmitter 14 and the receiver 16. Similarly, functions of the transceiver antenna 61 may be performed by separate antennas such as the transmitter antenna 13 and the receiver antenna 15.

Figure 7:
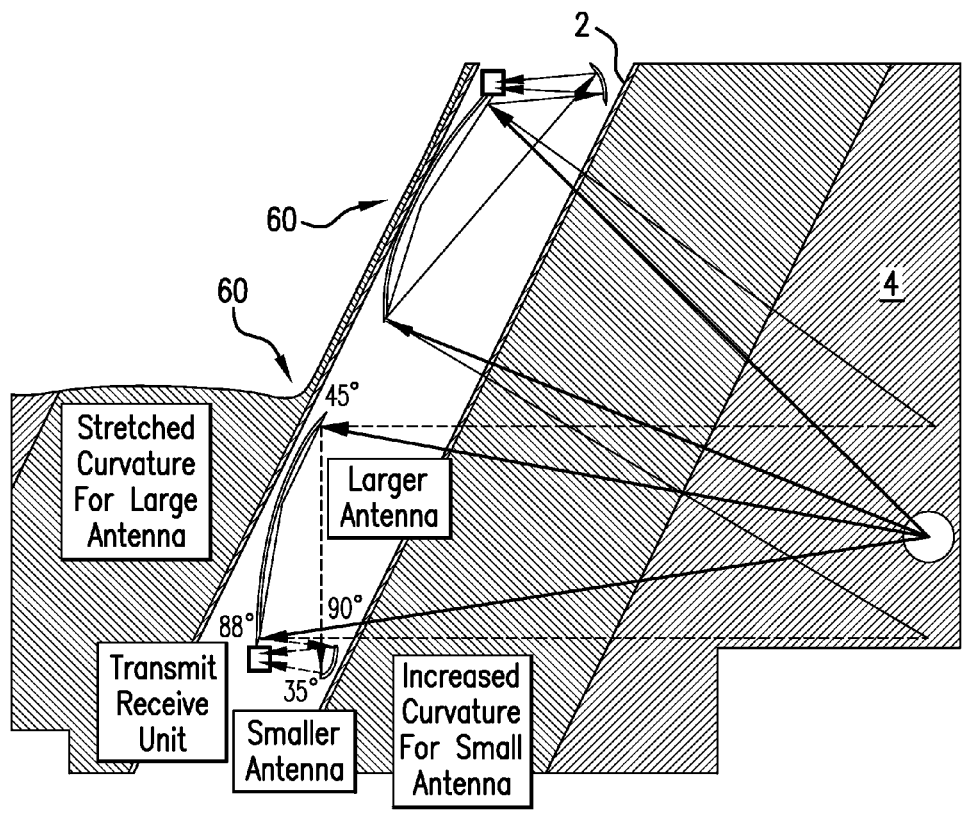
FIG. 7 depicts aspects of two antenna assemblies in the downhole tool in a deviated borehole.
Figure 8:
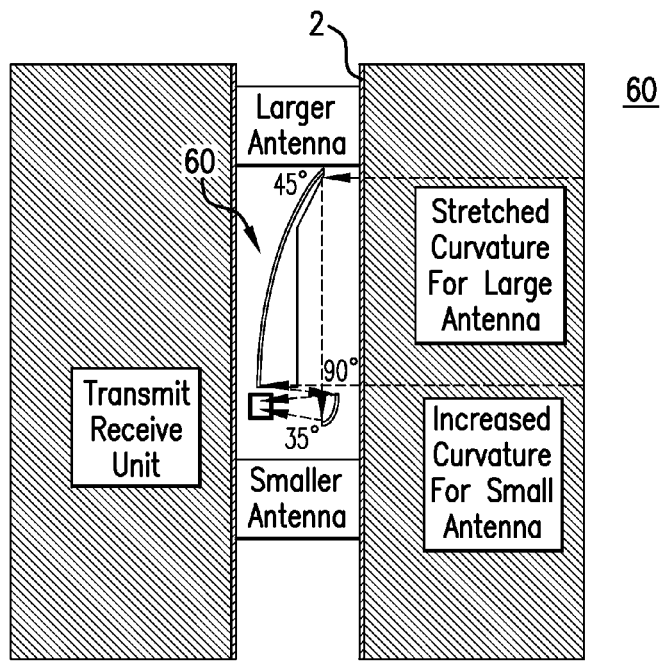
FIG. 8 depicts aspects of a single antenna assembly in the downhole tool in a vertical borehole.

In general, logging tools are long but very narrow in order to be conveyed through the borehole. Standard antenna shapes such as parabolics are often quite large and unsuited for narrow boreholes. Fortunately, fully radial parabolics or other shapes are not necessary to transmit, gather, or concentrate electromagnetic signals. Longer and larger but narrow antenna shapes may be used when combined with small curved secondary antenna groups as illustrated in FIGS. 7 and 8 for example. The actual antenna curvature will depend upon physical constraints such as the inside diameter available within specific logging tools. Somewhat angled antenna orientations with respect to the tool length axis further allow for still longer antenna geometries, thus, providing for even lower frequencies or longer shaped pulses than those used in conventional logging tools.

Figure 9:
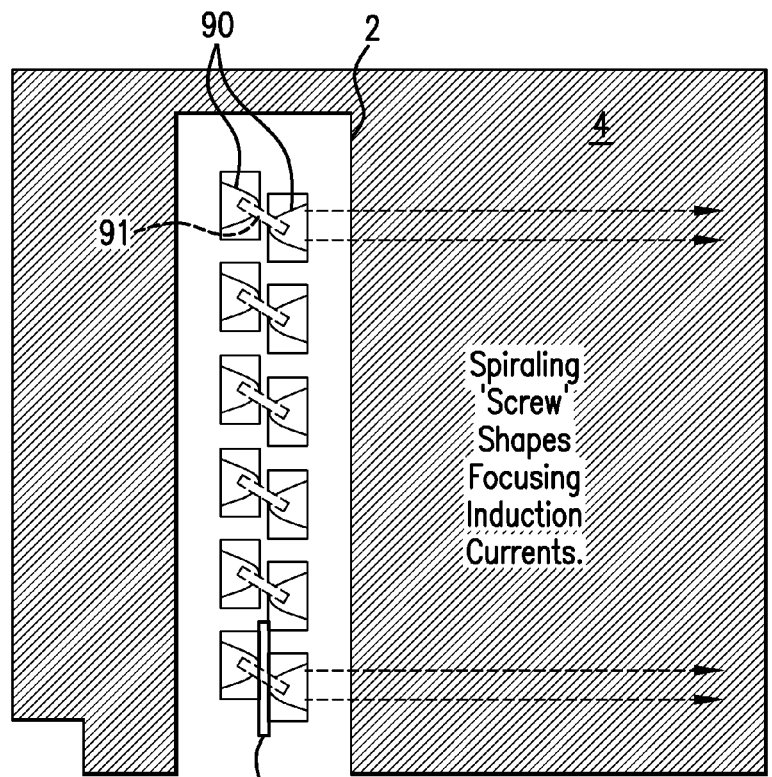
FIG. 9 depicts aspects of antenna assemblies having a spiraling screw shape for focusing induction currents.

In one or more embodiments, the ILT 10 includes a spiral "screw" like shape with small (i.e., small enough to fit within ILT 10) parabolic "grooving" 90 in order to focus or concentrate signals radiating out of a spiraling coiled wire 91 wound along the focal spacings as illustrated in FIG. 9. Thus, the usual large signal spreading of conventional induction tool coils is avoided. Short duty cycle high energy current pulses through the wire 91 may allow for relatively stronger signals to penetrate deeper into formations without overheating of circuitry. Also, the parabolic shapes can accommodate variations in frequencies for electromagnetic waves and variable grouped pulse shapes. Back lobe emissions may be absorbed by electromagnetic emission absorbing material 92 such as steel wool, copper alloys, or other conductive materials. Receiving parabolic screw antenna shapes may respond far less to spurious shoulder bed signals than conventional coil systems.

Figure 10:
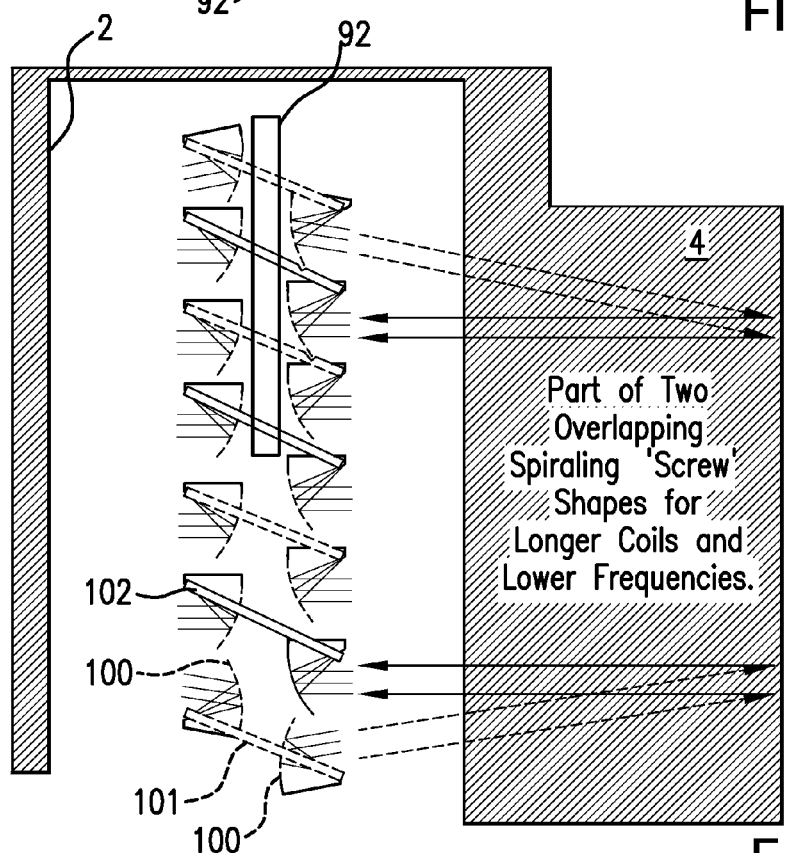
FIG. 10 depicts aspects of antenna assemblies provide two spiraling screw shapes for longer coils and lower frequencies.

Half or partial rather than full parabolic antenna systems may allow for more compact logging tools and thinner bed resolutions due to providing an increased number of antenna systems 60 in the ILT 10 as illustrated in FIGS. 10-13. In FIG. 10, the ILT 10 includes as spiral shaped half or partial grooving 100 for reflecting electromagnetic energy or signals from or to the spiral coiled wire 101 (acting as transmitting or receiving antenna). In one or more embodiments, the grooving 100 is configured such that a focus of a section of the grooving 100 overlaps the focus of another section of grooving 100 in order to provide for deep investigation orientations and to help limit counter current spreading in the formation 4. In one or more embodiments, two wires (101 and 102) are alternately wrapped in the grooving 100 to provide two overlapping spiraling screw shapes for longer coils and lower frequencies f.

Numerous angular orientations may be used for antenna combinations to investigate different depths (both radial and longitudinal) and portions of formations as illustrated in FIGS. 11-14.

Figure 11:
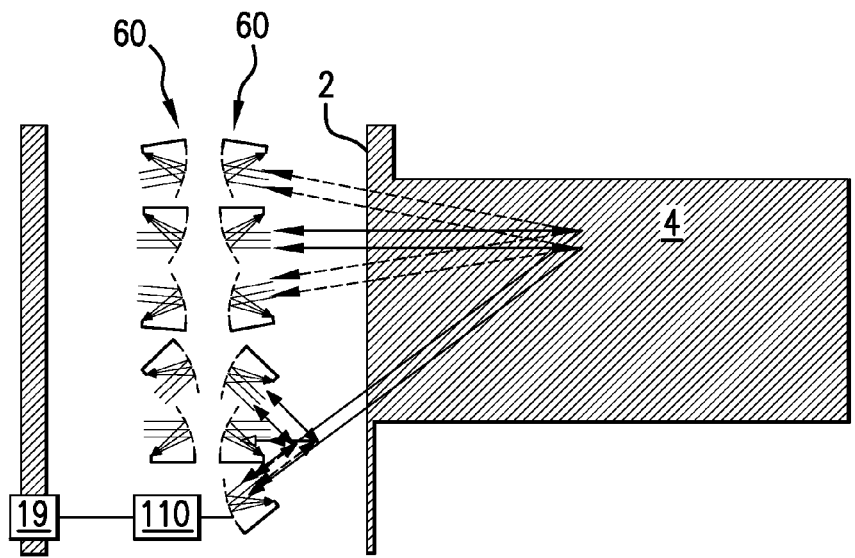
FIG. 11 depicts aspects of antenna system orientations for shallow and deep investigation of earth formations.

In the side-view of FIG. 11, one or more of the antenna systems 60 can be angled for shallow or deep investigation orientations that include both horizontal and vertical components for anisotropy sorting. In one or more embodiments, a pair of antenna systems 60 is configured to overlap a volume of investigation of another pair of antenna systems 60. In addition, a motor 110 may be coupled to one or more of the antenna systems 60 in order to provide scanning at different angles. In one or more embodiments, the motor 110 may be controlled by the controller 19 in order to coordinate setting the angle with a specific characteristic of the electrical current to be transmitted to the transceiver antenna 61. In one or more embodiments, the motor 110 may be configured to move the antenna system or individual antennas in the antenna system such as by displacement or rotation.

Figure 12:
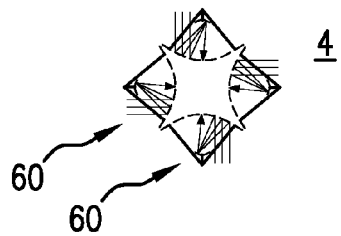
FIG. 12 depicts aspects of antenna system orientations directionally orientated investigations of earth formations.

In the top-view of FIG. 12, a group of antenna systems 60 are azimuthally distributed about a circumference of the ILT 10 in order to obtain azimuthal measurements that provide formation directional anisotropies. The group of antenna systems 60 illustrated in FIG. 12 can be used alone or in combination with other antenna systems such as those shown in the other figures herein.

Figure 13:
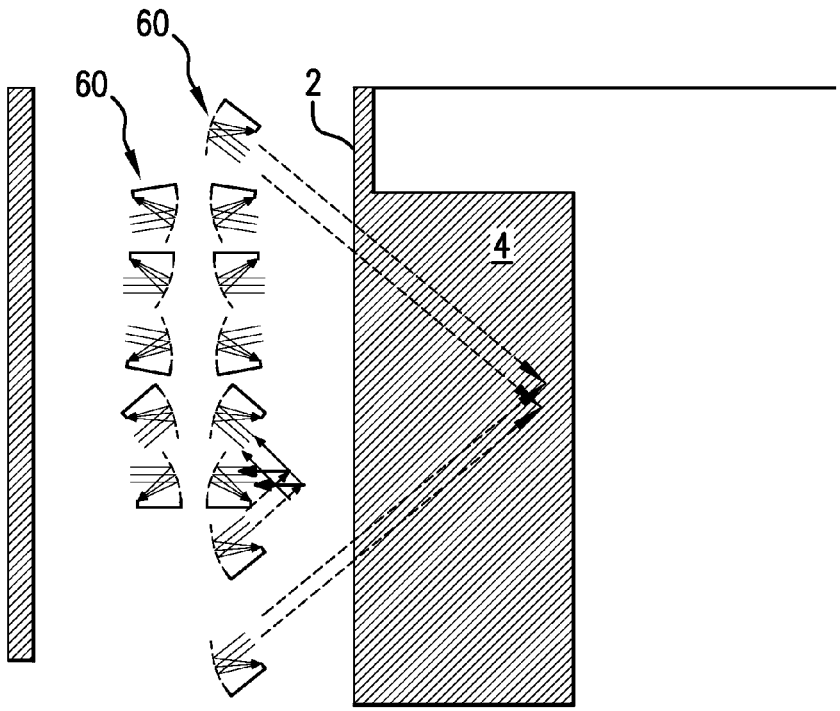
FIG. 13 depicts aspects of selecting combinations of antenna systems for investigating various depths into earth formations.

In the side-view of FIG. 13, the antenna systems 60 have different angles of orientation. By having the controller 19 select a combination of certain antenna systems 60 having specific orientation angles, various depths into the formation 4 may be probed. In one or more embodiments, the controller 19 may select an antenna system 60 to alternately emit electromagnetic energy that results in a signal being received by another antenna system 60 and then receive signals due to the emission of electromagnetic energy by the another antenna system 60.

Figure 14:
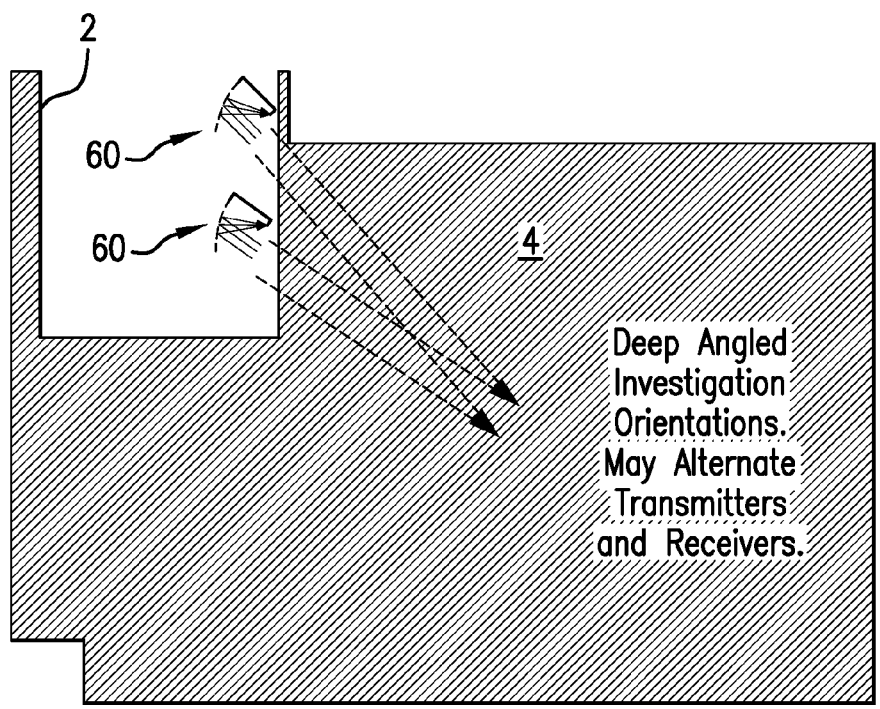
FIG. 14 depicts aspects of antenna system orientations for looking forward ahead of a drill bit.

In the side view of FIG. 14, the antenna systems 60 have orientation angles for probing ahead of the ILT 10 in the borehole 2. As in the embodiment of FIG. 13, the antenna systems 60 may alternate transmitting and receiving functions. In one or more embodiments, the look-ahead measurements may be transmitted to the computer processing system 11, which may use the measurements to input control signals to the drilling rig 8 in order to steer the drilling of the borehole 2.

Figure 15:
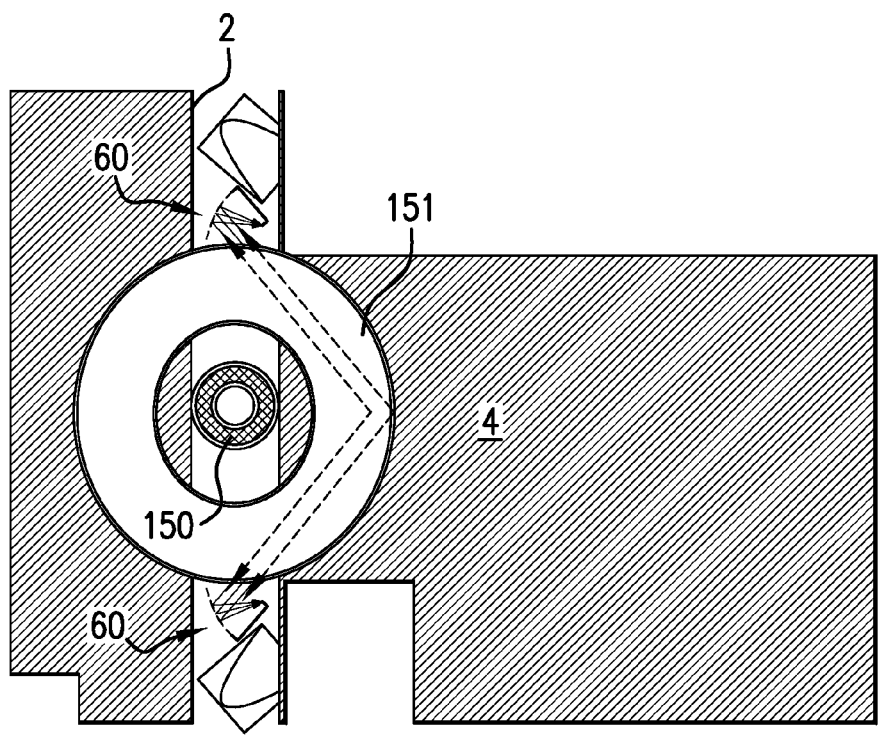
FIG. 15 depicts aspects of antenna combinations to increase investigation depths using circular induction currents.

Antennas systems 60 with parabolic, partial parabolic, or various altered curvatures can acquire induced formation signals from electromagnetic energy emitted by a vertical or otherwise oriented coil 150 as illustrated in the side-view of FIG. 15. The embodiment of FIG. 15 provides focused reception of localized portions of circular induction current shown at 151, which may be horizontal as well as vertical. Advantages include sampling specific, oriented, and localized portions of the total induction signals from within formations. Also, signature signals may be acquired by rapid sampling using the analog to digital converters, especially if a variety of signals are being generated by the oriented transmitter coils.

Figure 17:
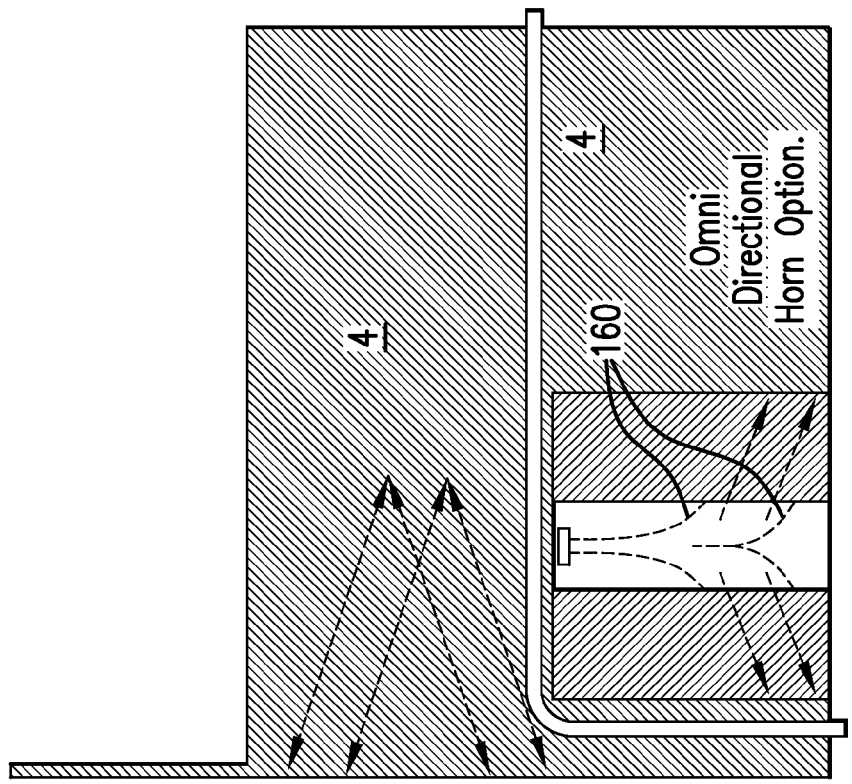
FIG. 17 depicts aspects of an omni-directional horn waveguide in an induction logging tool.
Figure 16:
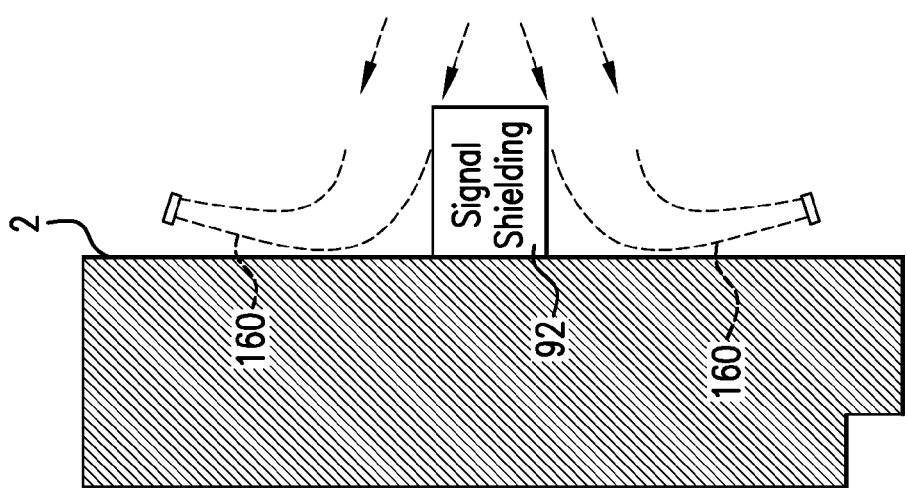
FIG. 16 depicts aspects of horn waveguides in an induction logging tool.

It can be appreciated that a waveguide such as a horn waveguide or horn antenna, as illustrated in FIG. 16, may be used in lieu of or in addition to a reflector antenna. A horn waveguide 160 or horn antenna groups can be placed at many varying orientations and can be rotated or reoriented by the motor 110. Also, horn antenna systems can be focused or oriented toward selected parts of formations. Information about formation dips (or slopes) may be extractible from combined processing of signature patterns that vary with different orientations and depths of investigations. Angled horn orientations allow for slightly longer antenna sizes within tools. Also, a horn major semi axis can be oriented along the tool length with the shorter minor semi axis across the restricted width of the tool. Hence, larger horn signal entrance or exit shapes and larger total areas for waveguide type cross sections become possible. Fully circular 'Omni' horn antennas, as illustrated in FIG. 17, can provide radial coverage rather than localized focusing or orientations.

Processing combinations of signals from many antenna groupings may enable sorting of formation areas contributing to composite signals. Angular localized conductivity data may be used in making better conductivity and implied resistivity corrections for laminated or thinly interbedded zones. Current flaring into more conductive thin layers may be more detectable with varied combinations of signals and measurements than with conventional coils and sine waves. Current flaring around higher resistivity hydrocarbon bearing zones (and thin layers) often leads to underestimating the volume of hydrocarbons within reservoirs and can, thus, be avoided by the present disclosure.

Figure 18:
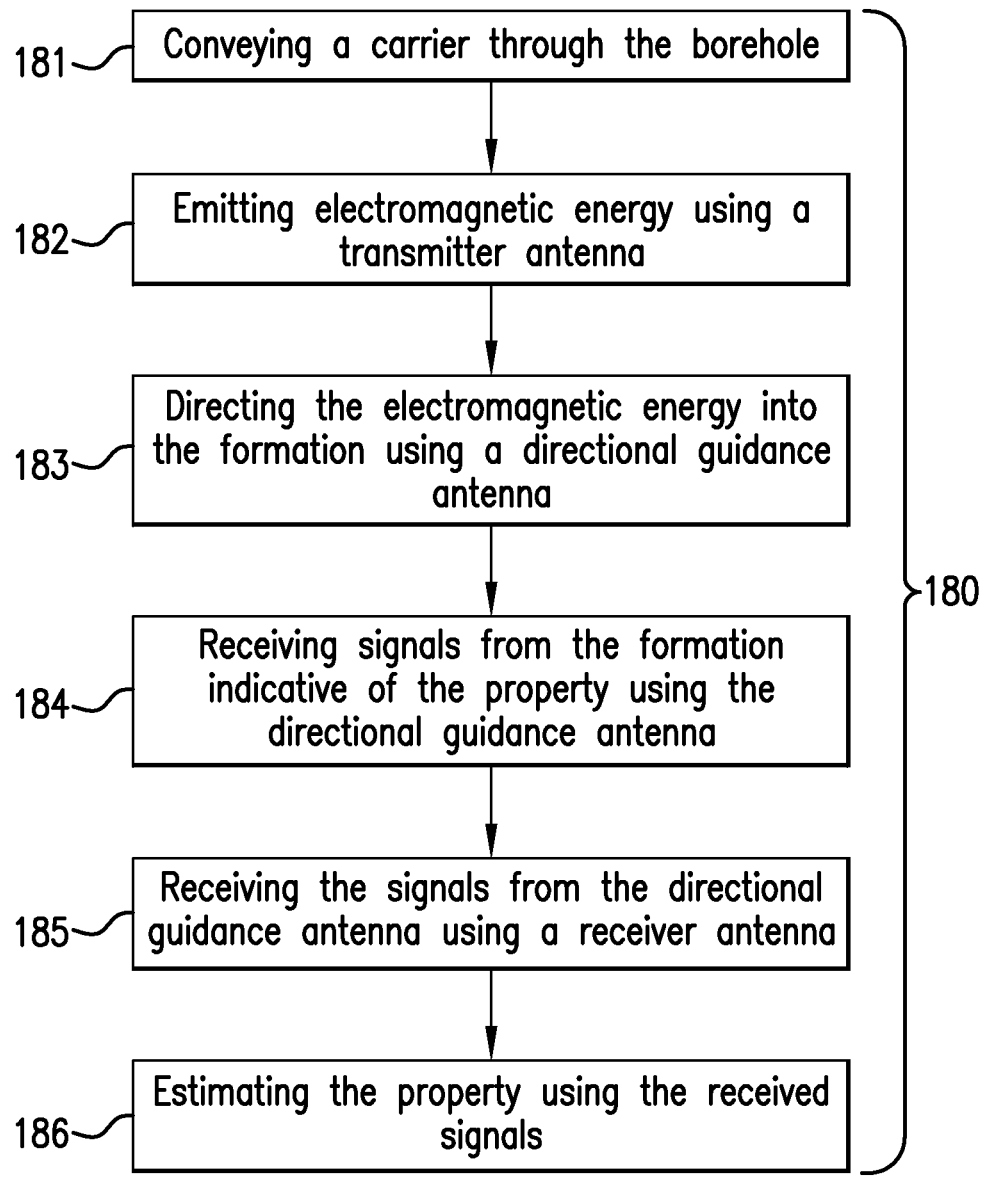
FIG. 18 illustrates a flow chart for another method for estimating a property of an earth formation penetrated by a borehole.

FIG. 18 is a flow chart illustrating a method 180 for estimating a property of a formation penetrated by a borehole. Block 181 calls for conveying a carrier through the borehole. Block 182 calls for emitting electromagnetic energy using a transmitter antenna. Block 183 calls for directing the electromagnetic energy into the formation using a directional guidance antenna. Block 184 calls for receiving signals from the formation indicative of the property using the directional guidance antenna. Block 185 calls for receiving the signals from the directional guidance antenna using a receiver antenna. Block 186 calls for estimating the property using the received signals.

It can be appreciated that the teachings herein may provide logs having highly enhanced induction, dielectric, and electromagnetic signature patterns of response signals from earth formations. Detecting fractures and deriving many more accurate and localized conductivities across a range of distance from boreholes are among the advantages of these teachings. For example, the teachings can provide borehole fluid invasion profiles, more accurately derived deep resistivities, and observable anomalies on signature patterns related to fractures and faults that lead to valuable evaluations of conventional and unconventional reservoirs. In addition, detected patterns (i.e., signatures) may have much higher signal to noise ratios compared to more limited measurements by conventional logging systems.

Further advantages include the ability to detect fractures in many low permeability (often shale) reservoirs. Shales, other conductive minerals, and fluid variations provide paths that often expand or disperse induced currents into larger geometries. Concurrent increases in apparent conductivities and decreases in derived resistivities and water saturations often result. However, more efficient concentrating of signals can be accomplished by increasing some focusing coil currents or altering antenna curvature in order to compress electromagnetic energy and signals into narrower concentrations than in conventional logging systems to provide better thin bed resolutions and more specific depths of investigations.

Further advantages include the abilities of digital to analog transmitter driver signals to be shaped to counter capacitance, inductance, and other signal distorting characteristics of circuitry, coils, or antenna systems. The digital to analog circuitry may also be used to generate short pulses of electrical current transmitted to the transmitter antenna 13 with rapid but uniform changes in currents to investigate shallow near borehole formation characteristics. Hence, the most appropriately shaped Foucalt, eddy, or induction currents can be created within formations using the present disclosure.

It can be appreciated that, after transmitting initial electromagnetic energy and receiving initial signals, firmware, software, or algorithms implemented by the controller or other processing system, may initiate transmission of novel and specially altered pulse patterns and frequencies of the electrical current to specifically evaluate characteristics of the borehole, the invasion zone, and/or portions of geologic formations based upon detected, derived, or displayed patterns. In addition, the orientations, declinations, and other positioning of the antennas can be specifically and dynamically altered in many varied combinations to more effectively investigate portions of the earth and borehole after receiving and evaluating the initial signals.

It can be appreciated that the advanced antenna systems disclosed herein can also be designed and size scaled for dielectric well logging that has been previously done at various high frequencies. Deeper, wider, and longer investigation signal detections may be obtained from using 'saw teeth', or other uniform, or specifically shaped rise times. More accurate measurements from larger formation volumes can be made than with conventional sine waves having complex and varying rates of change. Conventional dielectric measurements have severely limited volumes of investigations. Variations in small coil lengths attached to very short time staggered digital outputs can be combined to shape generated signals with uniformity or specifically shaped rise and fall time ramps or curves for pulses. Many different pulse durations, rise and fall times, and shapes of pulses may be generated to probe formation characteristics. Although common button type dielectric antenna combinations may be used in one or more embodiments, more efficient receiver antenna curvatures and geometries will capture and concentrate stronger detection signals from earth formations. Signals from the antenna systems may be amplified by groups of high frequency cascode paired transistors with lower intrinsic systematic noises and unilateralized coil compensations for internal capacitances at quite high pulse rate changes or high frequencies. However, heavily doped tunnel diodes acting in high frequency (or fast pulse) quantum avalanche amplification modes or other advanced circuitry may be used as alternatives or in addition to transistors for various signals. Conventional crystal oscillators and signal generation circuits may also be incorporated into the induction logging tools for use with the advanced antenna combinations. Expanding skids and articulating arms (that may include a caliper and micro-type log electrodes or other measurement systems) may provide close formation positioning for antenna systems. Amplified formation signals may be sent to very short duty period time staggered analog to digital converters and microprocessor systems for capturing, recording, and processing of signature patterns.

It can be appreciated that for numerous sets, series, and trains of pulses, the digital to analog converter can provide specific variations of uniformly consistent rise and fall rates of current changes.

It can be appreciated that the ILT 10 may be calibrated in a borehole having known borehole geometries, known formation geometries, and known formation electrical properties, in a laboratory with various formation geometries (including various bed dimensions) and electrical properties, or by analysis.

It can be appreciated that the antennas disclosed herein can have various curvatures constrained by various constraints dependent on the downhole tool size, selected frequency of probing electromagnetic energy, orientation of focus, and focus distance. The curvatures can be calculated using available antenna curvature equations.

In support of the teachings herein, various analysis components may be used, including a digital and/or an analog system. For example, the downhole electronics 9, the surface computer processing 11, the controller 19, the transmitter 14, the receiver 16, the DAC 17 or the ADC 18 may include the digital and/or analog system. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery), cooling component, heating component, magnet, electromagnet, sensor, electrode, transmitter, receiver, transceiver, antenna, controller, optical unit, electrical unit or electromechanical unit may be included in support of the various aspects discussed herein or in support of other functions beyond this disclosure.

The term "carrier" as used herein means any device, device component, combination of devices, media and/or member that may be used to convey, house, support or otherwise facilitate the use of another device, device component, combination of devices, media and/or member. Other exemplary non-limiting carriers include drill strings of the coiled tube type, of the jointed pipe type and any combination or portion thereof. Other carrier examples include casing pipes, wirelines, wireline sondes, slickline sondes, drop shots, bottom-hole-assemblies, drill string inserts, modules, internal housings and substrate portions thereof.

Elements of the embodiments have been introduced with either the articles "a" or "an." The articles are intended to mean that there are one or more of the elements. The terms "including" and "having" are intended to be inclusive such that there may be additional elements other than the elements listed. The conjunction "or" when used with a list of at least two terms is intended to mean any term or combination of terms. The terms "first" and "second" are used to distinguish elements and are not used to denote a particular order. The term "couple" relates to coupling a first component to a second component either directly or indirectly through an intermediate component. The term "directional guidance antenna" relates to a device that is configured to redirect incoming electromagnetic energy or signals from one direction to another direction including a focus to a point, area or volume. Directional guidance antennas encompass reflector antennas and waveguides.

It will be recognized that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

While the invention has been described with reference to exemplary embodiments, it will be understood that various changes may be made and equivalents may be substituted for elements thereof without departing from the scope of the invention. In addition, many modifications will be appreciated to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An apparatus for estimating a property of an earth formation penetrated by a borehole, the apparatus comprising:
    a carrier configured to be conveyed through the borehole;
    a transmitter antenna disposed at the carrier and configured to emit electromagnetic energy into the earth formation;
    a controller configured to control electrical current of frequency f transmitted to the transmitter antenna, wherein the transmitted electrical current is non-sinusoidal having a first section with a uniform positive slope and a second section with a uniform negative slope;
    a receiver antenna configured to receive a signal from the formation indicative of the property; and
    a processor configured to receive the signal from the receiver antenna and to estimate the property using the received signal.

2. The apparatus according to claim 1, wherein the electrical current is transmitted as a series of pulses.

3. The apparatus according to claim 2, wherein the controller is further configured to vary a shape of one or more different pulses, the frequency f of one or more different pulses, or combination thereof.

4. The apparatus according to claim 1, wherein the property is resistivity, conductivity, fracture pattern location or fault pattern location.

5. The apparatus according to claim 1, wherein a magnitude of a slope of the first section is less than a magnitude of a slope of the second section.

6. The apparatus according to claim 1, wherein a magnitude of a slope of the first section is greater than a magnitude of a slope of the second section.

7. The apparatus according to claim 1, wherein a magnitude of a slope of the positive-slope side and a magnitude of a slope of the negative-slope side are the same.

8. The apparatus according to claim 1, wherein the controller is further configured to:
    transmit first electrical current to the transmitter antenna to emit first electromagnetic energy having a first characteristic into the formation thereby causing the receiver antenna to receive a first signal; and
    transmit second electrical current to the transmitter antenna to emit second electromagnetic energy having a second characteristic into the formation thereby causing the receiver antenna to receive a second signal;
    wherein the controller is further configured to determine the second characteristic based on the received first signal and the processor is further configured to estimate the property using the second signal.

9. The apparatus according to claim 8, wherein the second characteristic comprises a change in amplitude, a change in slope of current, or a change in frequency or a change in pulse repetition rate when electrical current is transmitted as a series of pulses.

10. The apparatus according to claim 1, further comprising a transmitter coupled to the transmitter antenna and configured to transmit the non-sinusoidal current to the transmitter antenna in order to emit the non-sinusoidal electromagnetic energy.

11. The apparatus according to claim 10, wherein the transmitter comprises a digital to analog converter configured to convert a digital signal received from the controller into an analog signal or wave form having a desired characteristic.

12. The apparatus according to claim 1, further comprising a receiver coupled to the receiver antenna and configured to amplify the signal received by the receiver antenna in order for the received signal to be characterized by the processor.

13. The apparatus according to claim 12, wherein the receiver comprises an analog to digital converter.

14. A method for estimating a property of a formation penetrated by a borehole, the method comprising:
    conveying a carrier through the borehole;
    transmitting electrical current at frequency f to a transmitter antenna disposed at the carrier in order to emit electromagnetic energy into the earth formation, wherein a controller controls the electrical current such that the electrical current is non-sinusoidal having a first section with a uniform positive slope and a second section with a uniform negative slope;
    receiving a signal from the formation indicative of the property using a receiver antenna; and
    estimating the property using the received signal.

15. The method according to claim 14, further comprising: transmitting first electrical current having a first characteristic to the transmitter antenna to emit first electromagnetic energy into the formation thereby causing the receiver antenna to receive a first signal; and transmitting second electrical current having a second characteristic to the transmitter antenna to emit second electromagnetic energy into the formation thereby causing the receiver antenna to receive a second signal;

wherein the controller is further configured to determine the second characteristic based on the received first signal and the processor is further configured to estimate the property using the second signal.

16. The method according to claim 15, wherein the second characteristic comprises a change in amplitude, a change in slope of the first section, a change in slope of the second section, or a change in frequency.

17. The method according to claim 15, wherein the first electrical current is transmitted as a first series of pulses at a first pulse rate and the second electrical current is transmitted as a second series of pulses at a second pulse rate and the controller is further configured to determine the second pulse rate based on the received first signal.

18. The method according to claim 14, wherein the property is resistivity, conductivity, fracture pattern location or fault pattern location.

19. The method according to claim 14, wherein a magnitude of a slope of the first section is less than a magnitude of a slope of the second section.

20. The method according to claim 14, wherein a magnitude of a slope of the positive-slope side is greater than a magnitude of a slope of the negative-slope side.

21. The method according to claim 14, wherein a magnitude of a slope of the positive-slope side and a magnitude of a slope of the negative-slope side are the same.

22. A non-transitory computer readable medium comprising computer executable instructions for estimating a property of a formation penetrated by a borehole by implementing a method comprising:

transmitting electrical current to a transmitter antenna disposed at the carrier in order to emit electromagnetic energy of frequency f into the earth formation, wherein a controller controls the electrical current such that the electrical current is non-sinusoidal having a first section with a uniform positive slope and a second section with a uniform negative slope;

receiving a signal from the formation indicative of the property using a receiver antenna; and estimating the property using the received signal.

23. The medium according to claim 22, wherein transmitting comprises transmitting first electrical current having a first characteristic to the transmitter antenna to emit first electromagnetic energy into the formation thereby causing the receiver antenna to receive a first signal and transmitting second electrical current having a second characteristic to the transmitter antenna to emit second electromagnetic energy into the formation thereby causing the receiver antenna to receive a second signal and the method further comprises:

determining the second characteristic based on the first signal; and estimating the property using the second signal.

* * * * *